UNITED STATES PATENT OFFICE.

PHILIP H. ERTHEILER, OF PHILADELPHIA, PENNSYLVANIA.

PROCESS OF MANUFACTURING PLUG-TOBACCO.

SPECIFICATION forming part of Letters Patent No. 683,454, dated October 1, 1901.

Application filed October 17, 1900. Serial No. 33,410. (No specimens.)

*To all whom it may concern:*

Be it known that I, PHILIP H. ERTHEILER, a citizen of the United States, residing at No. 211 South Forty-fifth street, in the city of Philadelphia and State of Pennsylvania, have invented a new and useful Improvement in the Process of Manufacture of Plug-Tobacco, of which the following is a specification.

This invention relates to the making of plug-tobacco for chewing purposes, and has for its object the economy of material and improvement in the process of manufacture of plug-tobacco; and to this end it consists in spreading and rolling the leaves, including the stem, so as to reduce or flatten the stems to the thickness of the leaf, or approximately to such thickness, cutting into pieces of required size, and then placing the pieces in layers and compressing them. By this process I save the aroma and all of the matter contained in the stems and enrich the plug produced thereby as compared with plug-tobacco formed from leaves stripped off the stems.

The manner of conducting this process consists in opening the stems of tobacco-leaves by passing a tapering pointed instrument through the groove, into which the stems contract in drying, so as to prepare them for the next step of the process of flattening them without creasing the stem and leaf, and next compressing or flattening the stem and leaf to practically the same thickness by subjecting them to compression between rollers, preferably between non-adhesive surfaces, such as glazed paper or metallic sheets or plates, and thereby flattening the stems or ribs out broader and thinner and after such pressure and flattening cutting the leaves into suitable-sized pieces and subjecting them in piles to pressure to form compact plugs.

By opening the stems from their contracted form I avoid the sharp creasing of the edges of the stems and the weakening of the leaf at these points, and by retaining the stem or ribs in the leaf-tobacco I economize material and avoid and save the cost of labor in stripping, and the stem contributes a richness of aroma and flavor greater than that possessed by the web of the leaf.

Having described my invention, what I claim is—

The improved process of preparing tobacco-leaves for the manufacture of plug-tobacco, which consists in first spreading open the leaf-stem by making a longitudinal incision part way through the stem and then subjecting the leaf and stem, so opened and previously moistened, to pressure, thereby flattening the stems and ribs of the leaf to approximately the thickness of the web of the leaf, substantially as set forth.

PHILIP H. ERTHEILER.

Witnesses:
C. R. MORGAN,
A. P. SWEET.